United States Patent [19]

Hendrickson-Benkhoff et al.

[11] Patent Number: 5,512,649

[45] Date of Patent: Apr. 30, 1996

[54] TRANSPARENT, STRETCHED POLYPROPYLENE FILM

[75] Inventors: Hermann Hendrickson-Benkhoff, Rotenburg; Dietrich Stockmeier, Walsrode; Ulrich Reiners, Neuenkirchen, all of Germany

[73] Assignee: Wolff Walsrode Aktiengesellschaft, Walsrode, Germany

[21] Appl. No.: 386,789

[22] Filed: Feb. 10, 1995

[30] Foreign Application Priority Data

Feb. 17, 1994 [DE] Germany .......................... 44 05 062.3

[51] Int. Cl.⁶ ............................... C08K 7/00; C08L 23/12
[52] U.S. Cl. ...................... 526/348.1; 524/450; 524/570; 524/584; 428/213; 428/333; 428/338; 428/339; 428/461; 428/523; 428/910; 106/286.2; 106/286.5
[58] Field of Search ........................ 526/348.1; 524/450, 524/584, 493, 570; 428/461, 523, 910, 213, 333, 338, 339; 106/286.2, 286.5

[56] References Cited

U.S. PATENT DOCUMENTS

| | | | |
|---|---|---|---|
| 5,126,391 | 6/1992 | Yamamoto et al. | 526/348.1 X |
| 5,132,157 | 7/1992 | Asanuma et al. | 526/348.1 X |
| 5,137,955 | 8/1992 | Tsuchiya et al. | 524/584 X |
| 5,298,234 | 3/1994 | Nakazawa et al. | |

FOREIGN PATENT DOCUMENTS 0227168   7/1987   European Pat. Off. .

*Primary Examiner*—Fred Teskin
*Attorney, Agent, or Firm*—Sprung Horn Kramer & Woods

[57] ABSTRACT

At least monoaxially stretched polypropylene film containing an antiblocking agent, wherein the antiblocking agent has a cuboid and/or cubic, preferably cubic, geometry with bevelled, i.e. chamfered, edges and is X-ray amorphous.

11 Claims, 1 Drawing Sheet

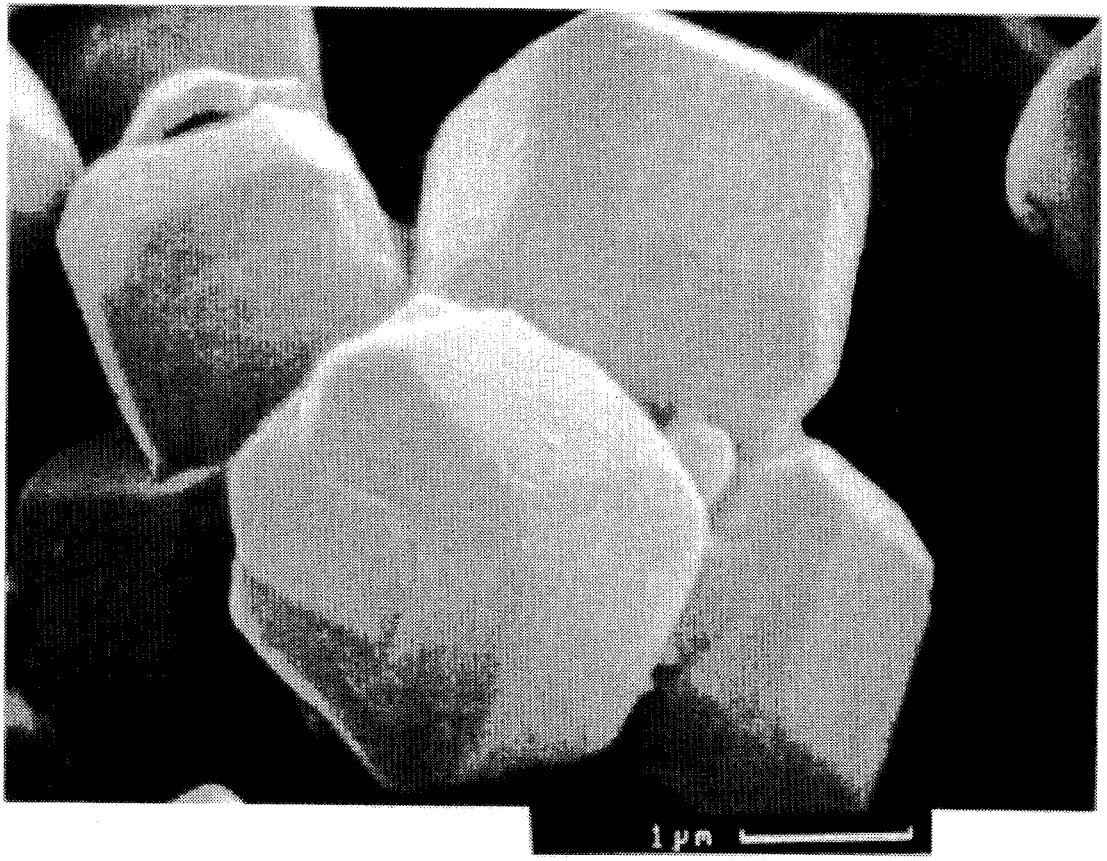

TRANSPARENT, STRETCHED POLYPROPYLENE FILM

The present invention relates to an at least monoaxially oriented, transparent polyolefin film which is distinguished by improved optical properties simultaneously accompanied by good machinability and reduced susceptibility to scratching.

Transparent oriented polyolefin films are used in large quantities as packaging materials. However, due to their good optical properties, they are also used in the printing industry for film laminating printed products. Processing. problems may occur on high speed, vertically and horizontally operated packaging and/or processing machinery. It is generally known that antistatic agents, lubricants and in particular antiblocking agents are incorporated into single and multi-layer polyolefin films in order to improve the relevant properties. It may be learnt from EP-A-27 586 and EP-A-189 242 that finely divided silicon dioxide ($SiO_2$) is extremely widely used as an antiblocking agent. This $SiO_2$ antiblocking agent (for example also known under the trade name SYLOBLOC 44 and 45 from Grace GmbH, Worms) with average particle sizes of 1.0 to 5.0 µm, preferably 2.5 to 4.0 µm, improves the frictional properties of the film, but significantly degrades optical properties, such as for example haze.

U.S. Pat. No. 4,529,764 describes the use of talcum, limestone, magnesium silicate, alumina, zinc oxides and also silica ($SiO_2$) as antiblocking agents in polyolefin films in order to improve the friction coefficients of the films. Here too the optical quality of the films, such as for example surface gloss, is substantially impaired by the addition of antiblocking agents.

In DE-A 34 44 157, a lamellar inorganic silicate is used as an antiblocking agent, which aligns itself predominantly parallel to the plane of the film when the film is biaxially oriented. The surface of the film in which the lamellar inorganic silicate with an average particle diameter of 0.1 to 1.0 µm is used is no more susceptible to scratching and the surface slip properties of the film are simultaneously improved. However, use of this silicate with a lamellar structure as an antiblocking agent does on the one hand worsen film haze and on the other impair the sealing activation temperature of the sealing layer side.

EP-A 0 447 652 and EP-A 0 353 368 in particular describe the spherical embodiment of a crosslinked polymer powder as an antiblocking agent. In at least monoaxially stretched single and/or multi-layer polyolefin films, the spherical antiblocking agent (known in EP 0 353 368 under the trade name Tospearl 120, 130 and 145 from the company Toshiba Silicone) substantially improves film friction coefficients in comparison with standard antiblocking agents, such as for example silicon dioxide ($SiO_2$). However, spherical antiblocking agents always cause a distinct degradation of the film's optical properties, such as for example haze.

The use of all these described antiblocking agents substantially improves the film friction coefficients and thus the machinability of a polyolefin film, but the films containing the stated antiblocking agents still always exhibit disadvantages in relation to optical properties such as haze and gloss.

There thus arises the object of providing a film with substantially improved optical properties, i.e. low grey fogging, elevated surface gloss and low haze, while retaining good machinability and thus low film friction coefficients, which film is particularly suitable as a single layer and/or composite film for processing on high speed, vertically and horizontally operated packaging and/or processing machinery of various types. It should moreover also be possible to manufacture the film straightforwardly using conventional processes in which the film is mono- or biaxially oriented with rollers and optionally a stenter frame.

This object is achieved by an at least monoaxially stretched multi-layer polypropylene film containing at least one lubricant, one antistatic agent and one. antiblocking agent, which antiblocking agent is characterised in that it has a cuboid or cubic geometry with bevelled, i.e. chamfered, edges and is X-ray amorphous.

In the preferred embodiment, the film is a three-layer transparent film. It is in transparent films that the advantages of the antiblocking agent to be used according to the invention in terms of haze, surface gloss, film friction coefficients, grey fogging and susceptibility to scratching become apparent. The antiblocking agent according to the invention is an Na/Al silicate (18 to 25% Al, 18 to 25% Si, 6 to 12% Na and the remainder $O_2$) with a preferably cuboid or cubic geometry. The distance between each pair of surfaces arranged in parallel to each other of the bevelled cuboid or cubic antiblocking agent is described as the edge length and is defined as follows:

height: h width: b depth: t, wherein the combinations b=t with b and t=h, h=b with h and b=t, h=t with h and t=b and b=h=t are possible. If the geometry of the antiblocking agent is such that the edges (distance between surfaces arranged in parallel to each other) of the blocking agent are of equal length, i.e. b=h=t, the geometry is cubic. In-other cases, the geometry is cuboid.

BRIEF DESCRIPTION OF THE DRAWING

The antiblocking agent according to the invention is preferably of cubic geometry, the edges of which have a bevel, i.e. are chamfered. FIG. 1 shows an example of the antiblocking agent according to the invention. The average edge lengths (distance between surfaces arranged in parallel to each other) b=h=t of the antiblocking agent according to the invention are from 1.0 to 4.0 µm, preferably from 1.5 to 3.0 µm.

DETAILED DESCRIPTION OF THE INVENTION

The antiblocking agent to be used according to the invention is preferably contained in a quantity of 500 to 5000 ppm, in particular 1000 to 3500 ppm related to the particular layer into which the antiblocking agent according to the invention is incorporated, in a single or multi-layer film. In the case of a multi-layer film, at least one outer layer always contains the antiblocking agent according to the invention. The average particle size is 2 to 5 µm, preferably 3.5 to 4.5 µm.

Surprisingly, by using the cubic and/or cuboid antiblocking agent with chamfered edges in single and multi-layer films, it is possible substantially to improve surface slip behaviour (DIN friction) and thus machinability, while retaining optical properties, i.e. low grey fogging, low haze and unchanged gloss. It was moreover not be expected that use of the antiblocking agent according to the invention could substantially reduce susceptibility to scratching.

In the preferred embodiment, the film is a three-layer transparent film. The base layer, i.e. the internal core layer enclosed by the two outer layers, of the multi-layer film is made from polypropylene polymer, which is a customary film manufacturing polymer for this application. Customary polymers are, for example, homopolymers, in particular isotactic polypropylene with an n-heptane soluble fraction of at most 15 wt. %, or a copolymer of propylene with ethylene or $C_4$ to $C_8$ olefins with a propylene content of at least 90 wt. %. Customary base layer propylene polymers conveniently have a melt flow index (MFI) of 0.5 to 8, in particular 1.5 to 4 g/10 min at 230° C. and 2.16 kp load (DIN 53 735) and a melting point of at least 140° C., preferably 150° C. or higher. The propylene polymers customarily have a density of 0.9 to 0.91 g/cm$^3$.

The outer layers are customarily used as the sealing and/or laminating layers of a multi-layer polyolefin film. In order to ensure that the outer layers have the required properties as sealing or laminating layers, numerous polyolefin materials, preferably the following, are used for the outer layers:

isotactic polypropylene with an n-heptane soluble fraction of at most 15 wt. % as per the polypropylene described as the base layer material $C_4$ to $C_8$ olefins with a propylene content of at least 90 wt. % random propylene/ethylene copolymers random propylene/1-butene copolymers random propylene/ethylene/olefin terpolymers
together with mixtures of at least two and/or more of the above polymers.

For use as laminating film, the outer layers are preferably made from the base layer material and, for use as heat sealable film, from a random propylene/ethylene copolymer containing 90.0 to 99.0 wt. % polypropylene and 1.0 to 10.0 wt. % of a polyethylene. This sealing layer material is characterised in that it has a melting point of 110° to 150° C., in particular 120° to 140° C. and a melt flow index (MFI) of 2 to 8, in particular 4 to 6 g/10 min at 230° C. and 2.16 kp load (DIN 53 735).

It is possible to incorporate further generally customary additives and auxiliary substances in usual quantities, such as for example lubricants, antistatic agents, antiblocking agents, into the layers of the single and/or multi-layer film. The customary additives, together with the cuboid and/or cubic antiblocking agent according to the invention are added during film production as master batches. The term master batch is taken to mean a mixture of a polymer raw material and a large quantity of additive. The master batches may contain only a single additive or also two or more additives. Preferred master batches are those with two or more additives based on the particular polymer raw material into which the master batch is to be incorporated. For use in a laminating film, the antiblocking agent according to the invention is masterbatched on the basis of a polypropylene polymer in accordance with the material of the outer layer and incorporated into the outer layers. For use in a heat sealable multi-layer film, the antiblocking agent according to the invention is compounded on the basis of a P/E copolymer, see the above list, and incorporated into at least one, preferably both outer layers.

The action of generally known antistatic agents is attributable to the hydrophilic portion of the molecule which is attached to the long-chain, hydrophobic. hydrocarbon chain. In the film, the molecular chains are aligned in such a manner that water may be attached to the hydrophilic portion on the film surface, so resulting in reduction of surface resistance which ultimately results the antistatic effect.

Preferred antistatic agents are alkali alkanesulphonates, polyether-modified, i.e. ethoxylated and/or propoxylated polydiorganosiloxanes (polydialkylsiloxanes, polyalkylphenylsiloxanes and the like) and/or substantially straight chain and saturated aliphatic, tertiary amines with an aliphatic residue with 10 to 20 carbon atoms which are substituted with two hydroxyalkyl ($C_1$–$C_4$) groups, of which N,N-bis-(2-hydroxyethyl)alkylamines with $C_{10}$–$C_{20}$, preferably $C_{12}$–$C_{18}$ as the alkyl group are particularly suitable. The effective quantity of antistatic agent is in the range from 0.05 to 3.0 wt. % related to the particular layer.

Customarily used lubricants are higher aliphatic acid amides, higher aliphatic acid esters, waxes and metal fats. Typical examples are erucamide and oleic acid amide, the customarily effective quantity of which is between 0.1 and 0.2 wt. %, related to the particular layer. Polymers of the polyalkylsiloxane group are also used.

As may be learnt from U.S. Pat. No. 4,529,764, further suitable inorganic additives are used for polyolefin films as antiblocking agents, such as for example silicon dioxide, talcum, limestone, calcium carbonate, alumina, silica, zinc oxides, magnesium silicate, aluminium silicate,. calcium phosphate and others, together with polymers which are incompatible, i.e. immiscible, with the material of the outer layer, such as polyamides, polyesters, polycarbonates, polymethyl methacrylate and the like.

Polyolefins are customarily stabilised against thermal degradation during production and processing into, for example, films by the use of stabilisers. By way of example, EP-A-27 586 and EP-A-263 882 describe preferred compounds with stabilising action and the combinations thereof for ethylene, propylene and other α-olefin polymers. The quantity necessary for adequate stabilisation is generally 0.1 to 2.0 wt. % related to the particular layer.

The films according to the invention may be produced using known processes such as lamination, coating or melt coextrusion. After extrusion and solidification of the thick film on a casting roll and/or in a water bath and/or a combination of both, the film is stretched, at least monoaxially, preferably biaxially. The film is here stretched in the machine direction (longitudinally) by a ratio of 4:1 to 7:1, preferably of 5:1 to 6:1 at a temperature of 120° C. to 150° C. The stretching ratio transverse to the machine direction (transverse stretching ratio) is within the range from 8:1 to 12:1, preferably from 9:1 to 11:1 and transverse film stretching is performed at a temperature of between 130° C. and 170° C. The biaxial orientation process (longitudinal and transverse stretching) is followed by thermal setting of the film. Heat setting is customarily performed at 1° C. to 40° C. below On completion of the film according to the invention, total film thickness is from 8 to 50 μm. The thickness of the outer layers of a multi-layer, preferably three layer, film is between 1.0 to 18.75%, preferably between 2.0 and 12.5% of the total film thickness. The single and/or multi-layer polyolefin films according to the invention are generally largely non-polar, which makes it difficult or even impossible to spread, for example, printing inks, adhesives etc. onto the film surface. In order to increase the wettability and consequently the affinity between the printing inks and/or adhesives and the non-polar film surface, it is necessary to subject the film surface to corona (spray) pretreatment. In this treatment, atmospheric oxygen is implanted onto the film surface in the form of carbonyl, epoxide, ether and/or alcohol groups. Further methods for pretreating polyolefin films are flame, plasma and fluorine pretreatment. The intensity of treatment is within the customary range, preferably between 36 and 42 mN/m.

Due to their outstanding surface slip properties, the films according to the invention are particularly suitable for processing on high speed packaging machinery. Processing in drum and tunnel laminators at elevated speeds is also facilitated.

Due to their exemplary optical properties, the films produced according to the invention are suitable for film lamination, in particular high gloss laminates, printing industry products, such as covers for books, brochures, book and record sleeves, packaging etc.

EXAMPLE 1

Using the coextrusion process described above, a biaxially oriented three-layer polypropylene film (outer layer a, core=base layer and outer layer b) is produced with the preferred stretching ratios (longitudinal 5:1 and transverse 10:1), an average longitudinal stretching temperature of 142° C. and an average transverse stretching temperature of 160° C. Outer side a of the three-layer film is corona pretreated. The coextruded film has a total thickness of 20 μm and is of the following structure:

Outer layer a:
Thickness:
  1 μm
Material:
  99.9 wt. % propylene/ethylene copolymer with a preferred melt flow index of 5 g/10 min (DIN 53 735 at 21.6N load and 230° C.) and a melting point of 140° C.
  0.1 wt. % silicon dioxide ($SiO_2$) with an average particle diameter of 3 to 4 μm.
Base layer:
Material:
  100 wt. % of a polypropylene polymer with a density of 0.91 g/cm$^3$ and a melt flow index of 3.3 g/10 min determined at 230° C. and a load of 2.16N to DIN 53 735.
Outer layer b:
Thickness:
  1 μm
Material:
  60 wt. % of a polymer blend comprising
    $a_1$) 50 wt. % of an ethylene/propylene/butylene terpolymer consisting of 1.4 wt. % ethylene, 2.8 wt. % butylene and 95.8 wt. % propylene (each value relative to the terpolymer) and
    $a_2$) 50 wt. % of a propylene/butylene copolymer consisting of 66.8 wt. % propylene and 33.2 wt. % butylene (relative to the copolymer) ($a_1+a_2$=TAFMER XR 107 L), corresponding to a content of 0.7 wt % ethylene, 81.3 wt. % propylene and 18 wt. % butylene, relative to the TAF MER XR 107 L. The polymer blend $a_1+a_2$ had a melt flow index of 8 g/10 min and a melting point of 150° C.
  39.6 wt. % of a propylene/ethylene copolymer with a preferred melt flow index of 5 g/10 min (DIN 53 735 at 21.6N load and 230° C.) and a melting point of 140° C.
  0.2 wt. % erucamide
  0.2 wt. % of an Na/Al silicate antiblocking agent from the company Grace with the name SP4-7936 having a preferably cubic geometry with chamfered edges and average edge lengths (distance between surfaces arranged in parallel to each other) μa (=b=h=t) of 1.0 to 4.0 μm, preferably of 1.5 to 3.0 μm.

EXAMPLE 2

A film with a total thickness of 20 μm was produced in accordance with the process described in example 1, but with the following changes to raw material composition:

Outer layer a and b:
Thickness:
  1 μm
Material:
  99.8 wt. % of a polypropylene polymer with a density of 0.91 g/cm$^3$ and a melt flow index of 9 g/10 min determined at 230° C. and a load of 2.16N to DIN 53 735.
  0.2 wt. % cubic antiblocking agent as
per example 1
Base layer:
Material:
  99.625 wt. % of a polypropylene polymer with a density of 0.91 g/cm$^3$ and a melt flow index of 3.3 g/10 min determined at 230° C. and a load of 2.16N to DIN 53 735
  0.274 wt. % of ethyoxylated amine as antistatic agent
  0.065 wt. % of erucamide
  0.036 wt. % of ethoxylated fatty acid amide

EXAMPLE 3

Total thickness:
  20 μm, single layer
Base layer:
Material:
  99.415 wt. % of a polypropylene polymer with a density of 0.91 g/cm$^3$ and a melt flow index of 3.3 g/10 min determined at 230° C. and a load of 2.16N to DIN 53 735
  0.274 wt. % of ethoxylated amine as antistatic agent
  0.065 wt. % of erucamide
  0.036 wt. % of ethoxylated fatty amide
  0.21 wt. % of cubic antiblocking agent as per example 1

EXAMPLE 4

A film with a total thickness of 20 μm was produced in accordance with the process described in example 2, but with the following changes to raw material composition:

Outer layer a and b:
Thickness:
  1 μm
Material:
  99.75 wt. % of a polypropylene polymer with a density of 0.91 g/cm$^3$ and a melt flow index of 9 g/10 min determined at 230° C. and a load of 2.16N to DIN 53 735.
  0.25 wt. % of cubic antiblocking agent as per example 1
Base layer:
Material:
  100 wt. % of a polypropylene polymer with a density of 0.91 g/cm$^3$ and a melt flow index of 3.3 g/10 min determined at 230° C. and a load of 2.16N to DIN 53 735

Comparative Example 1

A film was produced as in example 1, but the antiblocking agent as per example 1 in outer layer b was replaced with the same proportion of a silicon dioxide ($SiO_2$) with an average particle diameter of 4 μm.

Comparative Example 2

A film was produced as in example 2, but the antiblocking agent as per example 1 was replaced with the same proportion of a silicon dioxide ($SiO_2$) with an average particle diameter of 4 μm.

Comparative Example 2.1

A film was produced as in example 2, but the antiblocking agent as per example 1 was replaced with the same proportion of a predominantly spherical antiblocking agent with an average particle diameter of 0.5 to 7 μm, in particular of 0.7 to 4 μm, which is described in EP-A 0 477 652.

Comparative Example 3

A film was produced as in example 3, but the antiblocking agent as per example 1 was replaced with the same proportion of a predominantly spherical antiblocking agent with an average particle diameter of 0.5 to 7 μm, in particular of 0.7 to 4 μm, which is described in EP-A 0 477 652.

Comparative Example 4

A film was produced as in example 4, but the antiblocking agent as per example 1 was replaced with the same proportion of an amorphous silicon dioxide with an average particle diameter of 3 μm.

Table 1 summarises the properties of the biaxially oriented single and three-layer films from the examples and comparative examples.

Table 1 demonstrates the superiority of the single and multi-layer films produced according to the invention in examples 1 to 4 in terms of DIN film/film and film/metal friction, haze, grey fogging, susceptibility to scratching and surface gloss. A particularly positive property accompanying the use of the cubic antiblocking agent is the low haze achieved with simultaneously good to very good DIN friction values (F/M and F/F) of the films. Moreover, grey fogging, as a measure of film defects, is substantially lower in the film samples from the examples with the cubic antiblocking agents than in the comparison film samples.

dicular. Gloss is stated in gloss units GE in relation to a black glass standard. The surface gloss value should be as high as possible.

Haze

Haze is caused by light scattering from particles distributed on the surface of and within the film, such as lubricant particles, antiblocking agents and impurities, and from surface roughness. Measurement is performed to test method ASTM D 1003 in % haze corresponding to % haze to ASTM test standard D 1003-61m, procedure A, after calibration of the measuring device with haze standards between 0.3 and 34% haze. Low haze values are desired.

Grey fogging

If film samples are held at various angles in the cone of light from a light source (for example an incandescent lamp or neon lamp), the light is refracted by any faults in the film, for example tears around the antiblocking agent arising during film stretching. Film samples with large tears will refract the light more than film samples with smaller tears. This refracted light is observed as grey fogging, which allows a clear differentiation to be made between large and small tears in the individual film samples due to different types of antiblocking agents.

The individual film samples with the various types of antiblocking agents were assessed by four people. All four people assessed each of the film samples to be compared, see table 1, three times in a different order, using the following marking scheme:

+: no to very slight grey fogging

○ slight grey fogging

−very distinct grey fogging

Susceptibility to scratching:

Susceptibility of the films to scratching was assessed visually after rubbing two films together between the thumb and index finger. This visual assessment was performed independently by four people on all the listed film samples. Each person tested the film samples three times in a different order. In each case, the film samples to be compared, see table 1, were compared with each other so as also to take account of the differing polymers used in the outer layers in the assessment of susceptibility to scratching. The following marking scheme was used:

TABLE 1

|  | Gloss 20° | Haze | Grey fogging | Susceptibility to scratching | DIN friction film/film | DIN friction film/metal |
| --- | --- | --- | --- | --- | --- | --- |
| Example 1 | 108 | 0.7 | + | ○ | 0.28 | 0.68 |
| Comparative example 1 | 105 | 1.1 | + | − | 0.38 | blocked |
| Example 2 | 152 | 1.1 | + | + | 0.24 | 0.22 |
| Comparative example 2 | 142 | 1.8 | ○ | − | 0.26 | 0.23 |
| Comparative example 2a | 149 | 1.3 | − | ○ | 0.37 | 0.32 |
| Example 3 | 142 | 1.7 | + | + | 0.20 | 0.17 |
| Comparative example 3 | 136 | 1.9 | − | ○ | 0.22 | 0.16 |
| Example 4 | 115 | 1.5 | + | ○ | 0.3 | 0.18 |
| Comparative example 4 | 118 | 1.8 | ○ | − | 0.42 | 0.25 |

Test Methods

Gloss, 20°

20° gloss measurement is performed on the basis of DIN 67 530. Gloss is defined as the regularly reflected proportion of an incident beam of light angled at 20° to the perpen- +: very few scratches ○: few scratches −: very numerous scratches DIN friction:

Test specification DIN 53 375 (Determination of frictional properties) is used to assess the surface slip of a film. Measurement of friction in accordance with this specification serves to determine film behaviour when two films rub together and when a film rubs against metal. The value stated is the coefficient of friction in accordance with the definition in DIN 53 375.

We claim:

1. At least monoaxially stretched polypropylene film containing an antiblocking agent, the antiblocking agent having bevelled edges, being X-ray amorphous, and having a geometry which is at least one of cuboid and cubic.

2. A film according to claim 1, wherein the antiblocking agent with bevelled edges has an average edge length between surfaces arranged in parallel to each other of 1.0 to 4.0 µm.

3. A film according to claim 1, wherein the antiblocking agent consists of 18 to 25% aluminum, 18 to 25% silicon, 6 to 12% sodium and the remainder oxygen.

4. A film according to claim 1, further containing at least one of a lubricant and an antistatic agent.

5. A film according to claim 1, wherein the film is transparent.

6. A film according to claim 1, wherein the film comprises a plurality of layers, the film containing the antiblocking agent in at least one outer layer.

7. A film according to claim 1, wherein the antiblocking agent is present in its particular layer in 500 to 5000 ppm.

8. A film according to claim 1, wherein the film has at least one outer layer which is at least one of heat laminated, heat sealed and metallized.

9. A film according to claim 1, wherein at least one side of the film was subjected to corona, fluorine or plasma treatment.

10. A film according to claim 1, of a total thickness between 8 and 50 µm.

11. A film according to claim 1, wherein the thickness of at least one of the outer layers is between 1.0 to 18.75% of the total thickness of the film.

* * * * *